US010758982B2

(12) United States Patent
Takahashi et al.

(10) Patent No.: US 10,758,982 B2
(45) Date of Patent: Sep. 1, 2020

(54) MAGNETIC POWDER AND PRODUCTION METHOD THEREOF, MAGNETIC CORE AND PRODUCTION METHOD THEREOF, COIL COMPONENT AND MOTOR

(71) Applicants: Murata Manufacturing Co., Ltd., Kyoto (JP); Tohoku Magnet Institute Co., Ltd., Sendai, Miyagi (JP)

(72) Inventors: Toru Takahashi, Nagaokakyo (JP); Akihiro Makino, Sendai (JP); Noriharu Yodoshi, Sendai (JP)

(73) Assignees: Murata Manufacturing Co., Ltd., Kyoto (JP); Tohoku Magnet Institute Co., Ltd., Sendai (JP)

( * ) Notice: Subject to any disclaimer, the term of this patent is extended or adjusted under 35 U.S.C. 154(b) by 292 days.

(21) Appl. No.: 15/661,583

(22) Filed: Jul. 27, 2017

(65) Prior Publication Data

US 2017/0320138 A1 Nov. 9, 2017

Related U.S. Application Data

(63) Continuation of application No. PCT/JP2016/052722, filed on Jan. 29, 2016.

(30) Foreign Application Priority Data

Jan. 30, 2015 (JP) .................................. 2015-017059
Jan. 30, 2015 (JP) .................................. 2015-017061

(51) Int. Cl.
| | | |
|---|---|---|
| *C22C 38/02* | (2006.01) | |
| *C22C 45/02* | (2006.01) | |
| *B22F 9/08* | (2006.01) | |
| *H02K 1/02* | (2006.01) | |
| *B22F 3/00* | (2006.01) | |
| *C22C 38/00* | (2006.01) | |
| *H01F 1/14* | (2006.01) | |
| *H01F 1/22* | (2006.01) | |
| *B22F 1/00* | (2006.01) | |
| *B22F 3/02* | (2006.01) | |
| *B22F 3/24* | (2006.01) | |
| *C22C 38/16* | (2006.01) | |
| *H01F 3/08* | (2006.01) | |
| *H01F 41/02* | (2006.01) | |

(52) U.S. Cl.
CPC ............... *B22F 9/082* (2013.01); *B22F 1/00* (2013.01); *B22F 3/00* (2013.01); *B22F 3/02* (2013.01); *B22F 3/24* (2013.01); *B22F 9/08* (2013.01); *C22C 38/00* (2013.01); *C22C 38/002* (2013.01); *C22C 38/02* (2013.01); *C22C 38/16* (2013.01); *C22C 45/02* (2013.01); *H01F 1/14* (2013.01); *H01F 1/22* (2013.01); *H01F 3/08* (2013.01); *H01F 41/0246* (2013.01); *H02K 1/02* (2013.01); *B22F 2003/248* (2013.01); *B22F 2009/0824* (2013.01); *B22F 2009/0848* (2013.01); *B22F 2301/35* (2013.01); *C22C 2200/02* (2013.01); *C22C 2202/02* (2013.01)

(58) Field of Classification Search
None
See application file for complete search history.

(56) References Cited

U.S. PATENT DOCUMENTS

| | | | | |
|---|---|---|---|---|
| 2009/0039724 A1* | 2/2009 | Wilson | ................. | H02K 49/106 310/154.33 |
| 2010/0043927 A1* | 2/2010 | Makino | .................. | C22C 45/02 148/612 |
| 2010/0097171 A1* | 4/2010 | Urata | ....................... | B22F 9/08 336/233 |
| 2010/0139814 A1* | 6/2010 | Makino | .................. | C22C 45/02 148/403 |
| 2015/0115766 A1* | 4/2015 | Taguchi | ................... | B22F 1/02 310/216.001 |
| 2018/0108465 A1* | 4/2018 | Takahashi | ............... | C22C 38/00 |

FOREIGN PATENT DOCUMENTS

| | | |
|---|---|---|
| JP | H04-314803 A | 11/1992 |
| JP | 2001-297766 A | 10/2001 |
| JP | 2002-060914 A | 2/2002 |
| JP | 2005-294461 A | 10/2005 |
| JP | 2012-082476 A | 4/2012 |
| JP | 2012-136770 A | 7/2012 |
| JP | 2013-055182 A | 3/2013 |
| JP | 2013-185162 A | 9/2013 |
| JP | 2014-075529 A | 4/2014 |
| WO | 2008/068899 A1 | 6/2008 |
| WO | 2008/129803 A1 | 10/2008 |
| WO | 2010/021130 A1 | 2/2010 |
| WO | 2014/136587 A1 | 9/2014 |

OTHER PUBLICATIONS

Translation of JP 2012-082476 (published Apr. 26, 2012) from Espacenet.*

(Continued)

*Primary Examiner* — George Wyszomierski
(74) *Attorney, Agent, or Firm* — Studebaker & Brackett PC

(57) ABSTRACT

A magnetic powder is represented by general formula $Fe_a Si_b B_c P_d Cu_e$. $71.0 \leq a \leq 81.0$, $0.14 \leq b/c \leq 5$, $0 \leq d \leq 14$, $0 < e \leq 1.4$, $d \leq 0.8a - 50$, $e < -0.1(a+d) + 10$, and $a+b+c+d+e=100$. A crystallinity is not more than 30% in the case of containing an amorphous phase and a compound phase, and is not more than 60% in the case of not containing a compound phase. The magnetic powder is produced with a gas atomization method. Whereby, it is possible to obtain an alloy magnetic material which has high saturation magnetic flux density and low magnetic loss; and a magnetic core, coil components, and a motor can be realized.

14 Claims, 6 Drawing Sheets

(56) References Cited

OTHER PUBLICATIONS

Translation of JP 2013-055182 (published Mar. 21, 2013) from Espacenet.*
International Search Report issued in PCT/JP2016/052722; dated Apr. 19, 2016.
Written Opinion issued in PCT/JP2016/052722; dated Apr. 19, 2016.

* cited by examiner

MAGNETIC POWDER AND PRODUCTION METHOD THEREOF, MAGNETIC CORE AND PRODUCTION METHOD THEREOF, COIL COMPONENT AND MOTOR

CROSS REFERENCE TO RELATED APPLICATIONS

This application is a continuation application of international patent application Serial No. PCT/JP2016/052722 filed Jan. 29, 2016, which published as PCT Publication No. WO2016/121951 on Aug. 4, 2016, which claims benefit of Japan patent application Nos. 2015-017059 filed Jan. 30, 2015, and 2015-017061 filed Jan. 30, 2015, the entire content of which are incorporated herein by reference.

TECHNICAL FIELD

The present disclosure relates to a magnetic powder and a production method thereof, a magnetic core and a production method thereof, a coil component and a motor, and more particularly an alloy-based magnetic powder suitable for a coil component such as a transformer and an inductor and a production method thereof, a magnetic core using the magnetic powder and a production method thereof, a variety of coil components using the magnetic powder such as a reactor and an inductor, and a motor.

BACKGROUND

In coil components used for a power inductor, a transformer or the like, a stator core and a rotor core equipped in a motor, magnetic powders using metallic magnetics are widely used.

Particularly, amorphous alloys of these magnetic powders have been, conventionally, researched and developed actively because they have excellent soft magnetic characteristics.

For example, World Intellectual Property Organization Publication No. 2008/068899 proposes an amorphous alloy composition having a compositional formula $Fe_aB_bSi_cP_xCu_y$ in which 73≤a≤85 at %, 9.65≤b≤22 at %, 9.65≤b+c≤24.75 at %, 0.25≤x≤5 at %, 0≤y≤0.35 at %, and 0≤y/x≤0.5.

In World Intellectual Property Organization Publication No. 2008/068899, it is attempted to obtain continuous ribbons, or rod-like, plate-like or ring shaped amorphous bulk materials which have high saturation magnetic flux density by using an alloy composition having the above-component composition.

Japanese Unexamined Patent Application Publication No. 2013-185162 proposes an alloy composition containing an amorphous phase as a principal phase and having a compositional formula $Fe_aP_bSi_xB_yC_zCu_c$ in which 79≤a≤86 at %, 8≤b≤15 at %, Y>0 at %, 0<X+Y+Z≤10 at %, and 0.4≤c≤2.0 at %.

Furthermore, in Japanese Unexamined Patent Application Publication No. 2013-185162, a Fe based nanocrystal alloy having the above-component composition is obtained by heat treating at a temperature which is $(T_{x1}-50°)$ C. or higher and $T_{x2}$ or lower when a temperature at which crystallization is initiated at first is referred to as a first crystallization initiation temperature $T_{x1}$, and a temperature at which second crystallization is initiated is referred to as a second crystallization initiation temperature $T_{x2}$.

Japanese Unexamined Patent Application Publication No. 2013-185162 attempts to obtain an alloy composition having excellent soft magnetic characteristics which can suppress a temperature rise due to heat generation, grain coarsening and further production of a compound even when an alloy is nanocrystallized, and which has high saturation magnetic flux density and low saturation magnetostriction.

SUMMARY

Technical Problem

However, although World Intellectual Property Organization Publication No. 2008/068899 describes an example in which a continuous ribbon is prepared by a single roll liquid quenching method, a rod-like member or a ring-shaped member is prepared by a copper mold casting method, and further a plate-like member is prepared by a double roll quenching method, it does not describe at all an example in which a powder material is prepared.

That is, although World Intellectual Property Organization Publication No. 2008/068899 discloses the alloy composition to be suitable for the continuous ribbon or the amorphous bulk materials (rod-like member, ring shaped member, plate-like member or the like), any of the single roll liquid quenching method, the copper mold casting method and the double roll quenching method are unsuited as a production method of a powder material. More, if a production method of the alloy composition varies, preparation conditions such as a cooling rate varies, and magnetic characteristics vary in accordance with the preparation conditions. Accordingly, even if the composition range suitable for preparation of the continuous ribbon or the bulk material is applied to a magnetic powder, it is thought to be a difficulty to attain desired magnetic characteristics.

Further, although Japanese Unexamined Patent Application Publication No. 2013-185162 describes that a powder-shaped alloy composition may be prepared by a water atomization method or a gas atomization method, and may be prepared by pulverizing a ribbon-shaped alloy composition, it describes only an example in which the continuous ribbon is prepared by the single roll liquid quenching method, and does not describes a specific example in which a powder material is prepared and characteristics or the like thereof are evaluated. Accordingly, even though a ribbon-shaped alloy composition is pulverized to prepare a powder material, it is thought to be a difficulty to attain desired magnetic characteristics as with Japanese Unexamined Patent Application Publication No. 2013-185162.

The present disclosure has been made in view of such a situation, and it is an object of the present disclosure to provide an alloy-based magnetic powder which has high saturation magnetic flux density and low magnetic loss and a production method thereof, a magnetic core using the magnetic powder and a production method thereof, a variety of coil components using the magnetic powder and a motor using the magnetic powder.

Solution to Problem

The present inventors have made studies for obtaining a composition range suitable for a magnetic powder with respect to a Fe—Si—B—P—Cu-based alloy, and consequently have found that when an atomic composition ratio of constituent elements is within a predetermined range, it is possible to obtain a magnetic powder which has high saturation magnetic flux density and low magnetic loss not only in the case of a single-phase of an amorphous phase but also even in the case where an amorphous phase and a crystalline phase are mixed.

The present disclosure has been made based on such findings, and a magnetic powder according to the present disclosure is characterized in that a principal component is represented by a general formula $Fe_aSi_bB_cP_dCu_e$, wherein the a, the b, the c, the d, and the e satisfy $71.0 \le a \le 81.0$, $0.14 \le b/c \le 5$, $0 \le d \le 14$, $0 < e \le 1.4$, $d \le 0.8a-50$, $e < -0.1(a+d)+10$, and $a+b+c+d+e=100$.

It is preferred that the magnetic powder of the present disclosure contains at least an amorphous phase and a crystalline phase consisting of a compound (hereinafter, referred to as "compound phase"), and has the crystallinity of not more than 30% which is measured by an X-ray diffraction method.

Thereby, it is possible to obtain the magnetic powder having high saturation magnetic flux density and low magnetic loss which are not inferior to the case in which the powder structure is formed of only an amorphous phase even though a crystalline phase, such as an $\alpha$-Fe phase (ferrite phase) having a body-centered cubic crystal structure or a compound phase having a large effect on magnetic characteristics, is contained in the magnetic powder.

It is preferred that the magnetic powder of the present disclosure contains at least an amorphous phase and does not contain the compound phase, and has the crystallinity of not more than 60% which is measured by an X-ray diffraction method.

Thereby, it is possible to obtain a magnetic powder of high quality having high saturation magnetic flux density and low magnetic loss which are not inferior to the case in which the powder structure is formed of only an amorphous phase even though the $\alpha$-Fe phase having a body-centered cubic crystal structure is contained in the magnetic powder.

The magnetic powder of the present disclosure can ensure specifically saturation magnetic flux density of not less than 1.30 T.

Furthermore, the magnetic powder of the present disclosure is preferably produced by the gas atomization method.

That is, a method for producing a magnetic powder according to the present disclosure is characterized by comprising a mixing step of mixing at least simple elements of Fe, Si, B, P and Cu or compounds containing these elements so that a principal component satisfies a general formula $Fe_aSi_bB_cP_dCu_e$; a heating step of heating a mixed product obtained by the mixing to prepare a molten metal; and a spraying step of spraying an inert gas to the molten metal to pulverize the molten metal, wherein in the mixing step, the single elements or the compounds are mixed so that the a, the b, the c, the d, and the e satisfy $71.0 \le a \le 81.0$, $0.14 \le b/c \le 5$, $0 \le d \le 14$, $0 < e \le 1.4$, $d \le 0.8a-50$, $e < -0.1(a+d)+10$, and $a+b+c+d+e=100$.

As described above, by preparing the magnetic powder with the gas atomization method, it is possible to obtain with high efficiency a spherical magnetic powder of high quality which has high saturation magnetic flux density and low magnetic loss.

In the method for producing the magnetic powder of the present disclosure, the spraying step is preferably a step of spraying a mixed gas formed by adding a hydrogen gas to the inert gas.

Thereby, mixing of oxygen in the magnetic powder can be more effectively avoided, and therefore mixing of impurities resulting from oxygen can be avoided as much as possible.

Furthermore, in the method for producing the magnetic powder of the present disclosure, the inert gas is preferably one of an argon gas and a nitrogen gas which is relatively low-cost and easily available.

In the method for producing a magnetic powder of the present disclosure, the heating step and the spraying step are preferably performed in an inert gas atmosphere, and more preferably performed in an atmosphere of a mixed gas formed by adding a hydrogen gas to the inert gas.

Also in this case, the inert gas is preferably one of an argon gas and a nitrogen gas which is relatively low-cost and easily available.

In the method for producing a magnetic powder of the present disclosure, a content ratio of the hydrogen gas in the mixed gas is preferably 0.5 to 7% in terms of partial pressure.

Further, a magnetic core according to the present disclosure is characterized in that the principal component is formed of the magnetic powder described above.

The magnetic core of the present disclosure preferably contains a binder, and has the content of the magnetic powder of not less than 60 vol % in terms of volume ratio.

A method for producing a magnetic core according to the present disclosure is characterized by comprising a forming step of mixing the magnetic powder prepared by the production method described above with a binder and forming the resulting mixture to prepare a compact, and a heat treatment step of heat treating the compact.

Further, the coil component according to the present disclosure is characterized in that a coil conductor is wound around a core part, wherein the core part is formed of the above-mentioned magnetic core.

Furthermore, the coil component according to the present disclosure is characterized in that a coil conductor is buried in a magnetic part, wherein a principal component of the magnetic part is formed of the above-magnetic powder.

In the coil component of the present disclosure, it is preferred that the magnetic part contains a binder, and the content of the magnetic powder in the magnetic part is not less than 60 vol % in terms of volume ratio.

A motor according to the present disclosure is characterized in that in a motor including a stator core in which a plurality of armature teeth are spaced at regular intervals on the same circumference, a coil conductor wound around the armature teeth, and a rotor core arranged rotatably inside the stator core, a principal component of at least one of the stator core and the rotor core is formed of the magnetic powder described above.

Advantageous Effects of the Disclosure

According to the magnetic powder of the present disclosure, since the magnetic powder is represented by the general formula $Fe_aSi_bB_cP_dCu_e$, and the a, the b, the c, the d, and the e satisfy the predetermined range described above, it is possible to obtain the magnetic powder which has high saturation magnetic flux density and low magnetic loss not only in the case of a single-phase of the amorphous phase but also even in the case where the amorphous phase and the crystalline phase are mixed.

Further, according to the method for producing a magnetic powder of the present disclosure, since the method includes the mixing step of mixing at least simple elements of Fe, Si, B, P and Cu or compounds containing these elements so that the principal component satisfies the general formula $Fe_aSi_bB_cP_dCu_e$, the heating step of heating a mixed product obtained by the mixing to prepare a molten metal, and the spraying step of spraying an inert gas to the molten metal to pulverize the molten metal, wherein in the mixing step, the single elements or the compounds are mixed so that the a, the b, the c, the d, and the e satisfy the above-mentioned predetermined range, it is possible to obtain the spherical magnetic powder of high quality with high efficiency.

Particularly, since in the spraying step, oxygen can be effectively absorbed by hydrogen gas by performing spraying in the atmosphere of the mixed gas formed by adding a hydrogen gas to the inert gas, it is possible to obtain, with high efficiency, the magnetic powder of high purity which can suppress mixing of impurities resulting from oxygen.

According to the magnetic core of the present disclosure, since the principal component is formed of the magnetic powder described above, it is possible to obtain the magnetic core having good magnetic characteristics in which the saturation magnetic flux density is high and the magnetic loss is low.

According to the method for producing a magnetic core of the present disclosure, since the method includes a forming step of mixing the magnetic powder prepared by the production method described above with a binder and forming the resulting mixture to prepare a compact, and a heat treatment step of heat treating the compact a desired magnetic core having good magnetic characteristics can be easily produced.

Further, according to the coil component of the present disclosure, since the coil conductor is wound around a core part, wherein the core part is formed of the magnetic core, it is possible to easily obtain the coil component having good magnetic characteristics in which the saturation magnetic flux density is high and the magnetic loss is low.

Furthermore, according to the coil component of the present disclosure, since the coil conductor is buried in a magnetic part, wherein the magnetic part is formed of the magnetic core, it is possible to easily obtain the coil component having good magnetic characteristics in which the saturation magnetic flux density is high and the magnetic loss is low.

According to a motor of the present disclosure, since in a motor including a stator core in which a plurality of armature teeth are spaced at regular intervals on the same circumference, a coil conductor wound around the armature teeth, and a rotor core arranged rotatably inside the stator core, the principal component of at least one of the stator core and the rotor core is formed of the magnetic powder described above, it becomes possible to obtain the motor of high quality which is low in power loss.

The above and other objects, features, and advantages of the disclosure will become more apparent from the following description.

DETAILED DESCRIPTION

Figure 1:
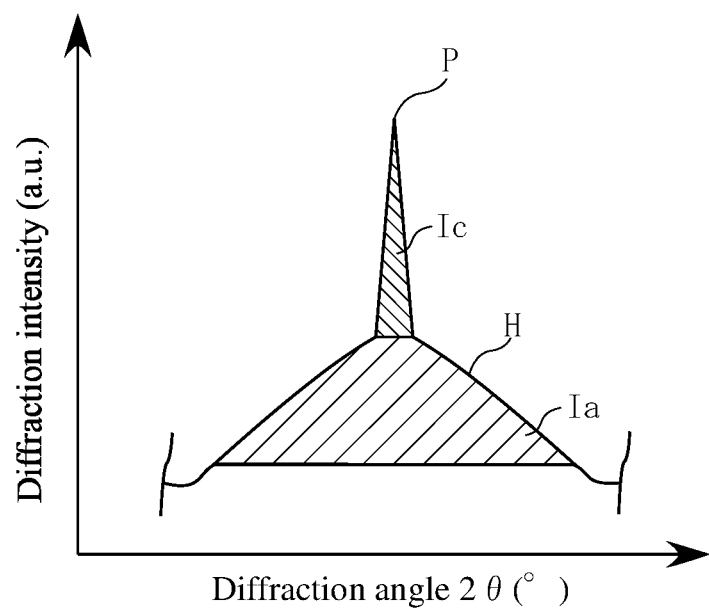
FIG. 1 is a view showing an embodiment of a diffraction peak of the magnetic powder of the present disclosure.

Next, embodiments of the present disclosure will be described in detail.

A magnetic powder according to the present disclosure contains a Fe—Si—B—P—Cu-based alloy as a principal component and the principal component can be represented by a general formula (A).

$$Fe_a Si_b B_c P_d Cu_e \quad (A)$$

Herein, atomic composition ratios a to e satisfy the following formulas (1) to (7).

$$71.0 \leq a \leq 81.0 \tag{1}$$

$$0.14 \leq b/c \leq 5 \tag{2}$$

$$0 \leq d \leq 14 \tag{3}$$

$$0 < e \leq 1.4 \tag{4}$$

$$d \leq 0.8a - 50 \tag{5}$$

$$e < -0.1(a+d) + 10 \tag{6}$$

$$a+b+c+d+e = 100 \tag{7}$$

More, the principal component means a component which is contained in the magnetic powder, for example, in an amount of 80 wt % or more, preferably 90 wt % or more.

In the present magnetic powder, since the general formula (A) satisfies the formulas (1) to (7), it is possible to obtain the magnetic powder which has high saturation magnetic flux density of not less than 1.30 T and is low in the magnetic loss.

Next, the reason why the atomic composition ratios a to e are set so as to satisfy the formulas (1) to (7) will be described.

(1) Atomic Composition Ratio a of Fe

Fe is an important element assuming a magnetic property and constitutes a predominant element of the general formula (A). In order to ensure desired magnetic characteristics, the atomic composition ratio a of Fe needs to be set to 71.0 or more. That is, when the atomic composition ratio a of Fe is less than 71.0, the ability of amorphous material formation is lowered to excessively form an α-Fe phase (ferrite phase) having a body-centered cubic crystal structure or a compound phase formed between constituent elements such as Fe—B, and therefore there is a possibility of causing an increase of the magnetic loss. On the other hand, when the atomic composition ratio a exceeds 81.0, there is a possibility of causing an increase of the magnetic loss, while the high saturation magnetic flux density can be ensured.

Therefore, in the present embodiment, each of the constituent elements are compounded so that the atomic composition ratio a of Fe satisfies $71.0 \leq a \leq 81.0$.

(2) Ratio b/c of Atomic Composition Ratio b of Si to Atomic Composition Ratio c of B Both of Si and B are elements having a good ability of amorphous material formation. However, when the ratio b/c (hereinafter, referred to as "X") of an atomic composition ratio b of Si to an atomic composition ratio c of B is less than 0.14 and consequently the content of B is greater than the content of Si, or the X exceeds 5 and consequently the content of Si is greater than the content of B, there is a possibility of causing an increase of the magnetic loss.

Therefore, in the present embodiment, each of the constituent elements are compounded so that the X satisfies 0.14≤X≤5.

(3) Atomic Composition Ratio d of P

Since P contributes to an improvement of the ability of amorphous material formation as with Si and B, it is contained in the magnetic powder as required. However, when the atomic composition ratio d of P exceeds 14 and is excessively contained, it is not preferred because there is a possibility of causing an increase of the magnetic loss.

Further, the atomic composition ratio d of P also receives certain restrictions in relation to the atomic composition ratio a of Fe. That is, when the atomic composition ratio d of P exceeds (0.8a–50) (hereinafter, referred to as "Y"), the content of P becomes excessive, and this case also causes an increase of the magnetic loss and is not preferred.

Therefore, in the present embodiment, constituent elements are compounded so that the atomic composition ratio d of P satisfies 0≤d≤14 and d≤Y.

(4) Atomic Composition Ratio e of Cu

Since Cu assumes a role of producing minute α-Fe grains in a quenched tissue to stabilize a microstructure, it is an essential constituent element in the present disclosure.

However, when the atomic composition ratio e of Cu exceeds 1.4 and is excessively contained, it is not preferred because there is a possibility of causing an increase of the magnetic loss.

Further, the atomic composition ratio e of Cu also receives certain restrictions in relation to the atomic composition ratio a of Fe and the atomic composition ratio d of P. That is, when the atomic composition ratio e of Cu becomes {−0.1(a+d)+10} (hereinafter, referred to as "Z") or more, the content of Cu becomes excessive, and this case also causes an increase of the magnetic loss and is not preferred.

Therefore, in the present embodiment, constituent elements are compounded so that the atomic composition ratio e of Cu satisfies 0<e≤1.4 and e<Z.

In addition, since the above-mentioned a to e represent atomic composition ratios of constituent elements in the general formula (A), It goes without saying that a sum of these a to e is 100.

Thus, in the present embodiment, since the general formula (A) satisfies all of the formulas (1) to (7), it is possible to obtain the magnetic powder which has high saturation magnetic flux density of not less than 1.30 T and is low in the magnetic loss.

Further, the magnetic powder contains at least the amorphous phase as a powder structure, and may further contain the crystalline phase, such as the α-Fe phase having the body-centered cubic crystal structure or the compound phase such as the Fe—B. The ratio between the amorphous phase and the crystalline phase can be indicated by the crystallinity Φ. In this case, since the compound phase has a large effect on magnetic characteristics compared with the body-centered cubic crystal structure, the present magnetic powder is different in crystallinity Φ between the case of containing the compound phase and the case of not containing the compound phase.

Specifically, when the magnetic powder contains at least the amorphous phase and the compound phase, the crystallinity Φ is 30% or less because the compound phase has a large effect on the magnetic characteristics as described above, especially the magnetic loss. On the other hand, when the magnetic powder contains at least the amorphous phase and does not contain the compound phase, for example, when containing the amorphous phase and the α-Fe phase having a body-centered cubic crystal structure, the crystallinity Φ is 60% or less because the α-Fe phase has an effect on the magnetic characteristics such as the magnetic loss smaller than the compound phase. That is, in the present magnetic powder, when the crystallinity Φ is not more than 30% in the case of containing the compound phase and the crystallinity Φ is not more than 60% in the case of not containing the compound phase, it is possible to obtain the magnetic powder having high saturation magnetic flux density and low magnetic loss not only in the case of being formed of only the amorphous phase but also even in the case where the crystalline phase and the amorphous phase are mixed, which are not inferior to the case of being formed of only the amorphous phase.

Besides, the crystallinity Φ can be easily calculated using an X-ray diffraction method.

FIG. 1 shows an essential part of an X-ray diffraction spectrum of the magnetic powder, and a horizontal axis represents a diffraction angle 2θ (°) and a vertical axis represents a diffraction intensity (a. u.).

When the crystalline phase and the amorphous phase are mixed in the magnetic powder, in the X-ray diffraction spectrum, as shown in FIG. 1, a portion indicating a crystalline phase has a diffraction peak P, and a portion indicating an amorphous phase forms halo H in a predetermined range of a diffraction angle 2θ (e.g., 34° to 56°). Then, the crystallinity Φ can be represented by a formula (8) when an area of a peak region exhibiting crystallinity is denoted by Ic, and an area of a halo region exhibiting an amorphous property is denoted by Ia.

$$\Phi = \{Ic/(Ic+Ia)\} \times 100 \qquad (8)$$

In addition, when a plurality of peak regions are present on the halo region, the area of the peak region Ic is an integrated value of each peak region.

Further, as described above, when the magnetic powder contains the compound phase, the crystallinity Φ is not more than 30%, and when the magnetic powder does not contain the compound phase, the crystallinity Φ is not more than 60%.

Although a method of producing the magnetic powder is not particularly limited, a gas atomization method is preferably used for producing thereof.

That is, although the gas atomization method is lower in a cooling rate than the single roll liquid quenching method and the water atomization method or the like, it has less restriction of a production process as distinct from the single roll liquid quenching method, and therefore it is possible to easily obtain the desired magnetic powder. Further, in the gas atomization method, a jet fluid is predominantly composed of an inert gas in contrast to the water atomization method in which water is used for the jet fluid, and therefore absorption of oxygen is lowered, mixing of impurities can be suppressed, and the magnetic powder of high quality which is spherical and easy to handle can be obtained.

Figure 2:
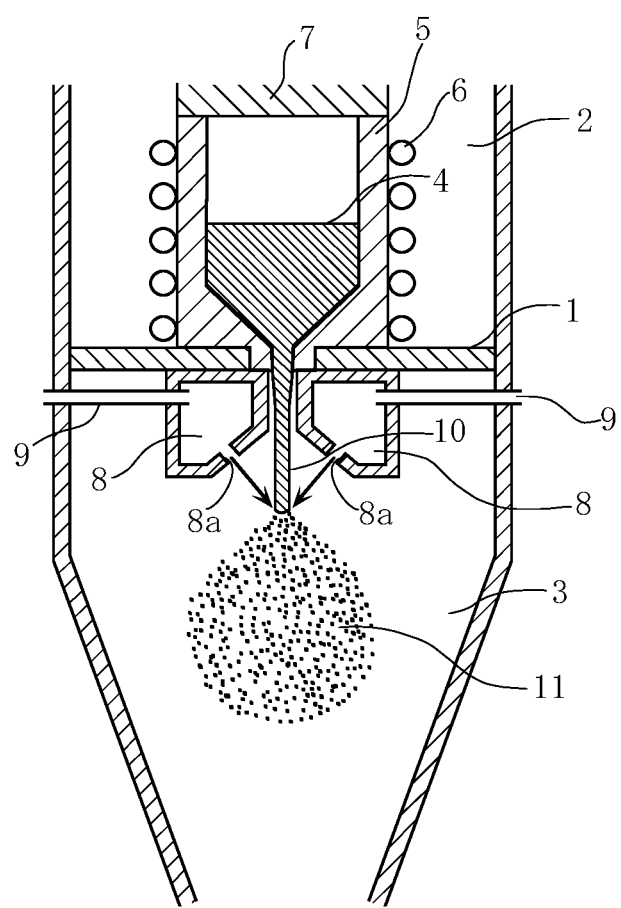
FIG. 2 is a sectional view showing an embodiment of the gas atomization device.

FIG. 2 is a sectional view showing an embodiment of a gas atomization device.

The gas atomization device is divided into a melting chamber 2 and a spraying chamber 3 with a divider 1 interposed between the melting chamber 2 and the spraying chamber 3.

The melting chamber 2 includes a crucible 5 formed of alumina or the like in which the molten metal 4 is held, and an induction heating coil 6 arranged at a perimeter of the crucible 5, and a top panel 7 to put the lid on the crucible 5.

The spraying chamber 3 includes a gas injection chamber 8 provided with an injection nozzle 8a, a gas supply tube 9 which supplies an inert gas as a jet fluid to the gas injection chamber 8, and a molten metal supply tube 10 which guides a molten metal 4 to the spraying chamber 3.

The magnetic powder can be produced in the following manner.

First, simple elements of Fe, Si, B and Cu or compounds containing these elements are prepared, and further simple elements of P or compounds containing the P is prepare as required, and predetermined amounts of them were weighed and mixed to obtain an alloy material.

Next, a high frequency power source is applied to the induction heating coil 6 to heat the crucible 5, and an alloy material is supplied to the crucible 5 to melt the alloy material, and thereby, a molten metal 4 is obtained.

Then, inert gas as a jet fluid is supplied to the gas supply tube 9 and the gas injection chamber 8, and the inert gas is sprayed from the injection nozzle 8a to the molten metal 4 falling from the molten metal supply tube 10, as indicated by an arrow, to pulverize/quench the molten metal 4, and thereby, the magnetic powder 11 having, for example, an average particle size of 100 μm or less and represented by the general formula (A) satisfying formulas (1) to (7), is prepared.

As described above, in the present embodiment, since the magnetic powder is produced with the gas atomization method in which the inert gas is used for the jet fluid, it is possible to obtain the magnetic powder of high quality, which is spherical and easy to handle, with less restriction of a production process as distinct from the single roll liquid quenching method and without exhibiting an irregular shape of the magnetic powder as distinct from the water atomization method. Further, since the inert gas is used for the jet fluid, an amount of oxygen is small, and it becomes possible to suppress mixing of impurities.

In the above-production method, the inert gas is used for the jet fluid in spraying treatment, and further it is also preferred to use a mixed gas formed by adding a hydrogen gas to the inert gas.

Atmospheres of heating treatment and spraying treatment are not particularly referred to; however, these treatments are preferably performed in an inert gas atmosphere, and more preferably performed in an atmosphere of a mixed gas formed by adding a hydrogen gas to an inert gas.

That is, by bringing the spraying chamber 3 into the mixed gas atmosphere and performing spraying treatment, mixing of oxygen in the magnetic powder 11 can be more effectively avoided, and therefore mixing of impurities resulting from oxygen can be avoided as much as possible.

Further, an applied voltage is increased to increase a heat input to the crucible 5 by bringing the melting chamber 2 into the mixed gas atmosphere described above and performing high frequency induction heating. This enables high speed melting to quickly prepare a molten metal 4.

In addition, the content ratio of the hydrogen gas in the mixed gas is not particularly limited; however, it is preferably 0.5 to 7% in terms of partial pressure from a practical viewpoint such as industrial availability.

The inert gas used for the jet fluid or an atmospheric gas in heating treatment and spraying treatment is not particularly limited as long as it belongs to a category of an inert gas, and a helium gas, a neon gas or the like can be also used; however, an argon gas which is easily available and low-cost is usually preferably used.

As described above, in the present embodiment, performing of induction heating in the atmosphere of the mixed gas formed by adding the hydrogen gas to the inert gas enables high speed melting of the alloy material, and spraying of the mixed gas formed by adding the hydrogen gas to the inert gas to the molten metal enables to more effectively suppress the mixing of impurities in the magnetic powder 11, and therefore it is possible to quickly and efficiently obtain the magnetic powder of high quality and high purity which has high saturation magnetic flux density and low magnetic loss, and is spherical and easy to handle.

Figure 3:
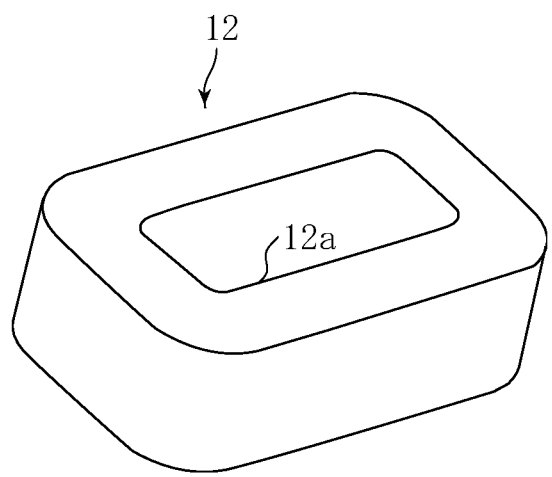
FIG. 3 is a perspective view showing an embodiment of the magnetic core according to the present disclosure.

FIG. 3 is a perspective view showing an embodiment of a magnetic core according to the present disclosure, and the magnetic core 12 is formed in a ring shape having a long hole-like hole part 12a.

The magnetic core 12 is formed of a composite material which contains the magnetic powder of the present disclosure described above as a principal component and at least a resin material (binder) such as an epoxy resin.

Besides, the content of the magnetic powder in the composite material is not particularly limited, and is preferably not less than 60 vol % in terms of volume ratio. When the content of the magnetic powder is less than 60 vol %, the content of the magnetic powder is excessively low, and there is a possibility that magnetic permeability or the saturation magnetic flux density is lowered to cause lowering of magnetic characteristics. An upper limit of the content of the magnetic powder is preferably 99 vol % or less, since the magnetic powder has only to be contained to an extent that a resin material achieves the desired action and effect.

The magnetic core can be easily produced in the following manner.

The present magnetic powder described above and a resin material (binder) such as an epoxy resin are kneaded and dispersed to prepare a composite material. Then, forming is performed using, for example, a compression forming method to prepare a compact. That is, the composite material is poured into a cavity of a heated die, pressurized to about 100 MPa, and pressed to prepare a compact.

Thereafter, the compact is taken out of a forming die, and subjected to heat treatment at a temperature of 120 to 150° C. for approximately 24 hours to accelerate curing of a resin material, and thereby, the magnetic core 12 is prepared.

Figure 4:
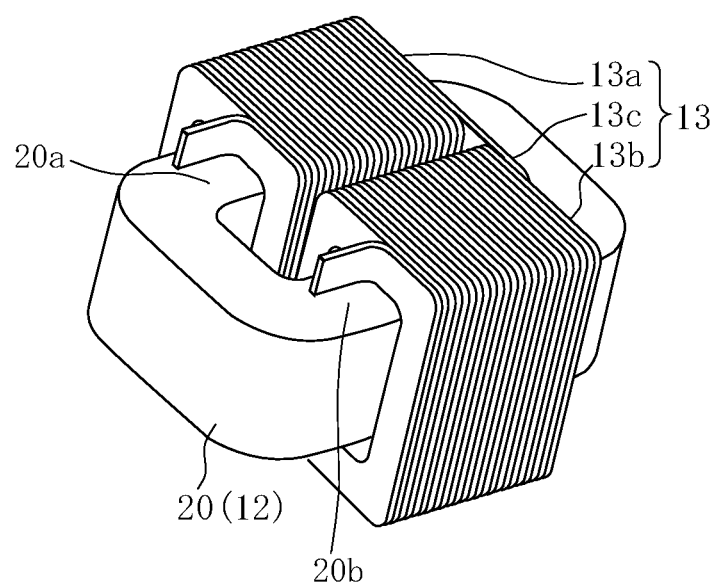
FIG. 4 is a perspective view showing an internal structure of a reactor as a first embodiment of the coil component according to the present disclosure.

FIG. 4 is a perspective view showing a reactor as an embodiment of a coil component according to the present disclosure.

In the reactor, a coil conductor 13 is wound around a core part 20, and the core part 20 is formed of the magnetic core 12.

That is, the long hole-like core part 20 has two long side parts 20a and 20b parallel to each other. The coil conductor 13 consists of a first coil conductor 13a wound around one long side part 20a, a second coil conductor 13b wound around the other long side part 20b, and a connecting part 13c which connects the first coil conductor 13a and the second coil conductor 13b, and these first coil conductor 13a, second coil conductor 13b and connecting part 13c are unified. Specifically, in the coil conductor 13, one rectangular wire lead made of copper or the like is coated with an insulating resin such as a polyester resin or a polyamide imide resin, and wound around both of the one long side part 20a and the other long side part 20b of the coil conductor 20 in the form of a coil.

Thus, in the present reactor, since the coil conductor 13 is wound around the core part 20 composed of the magnetic core 12, it is possible to obtain, with high efficiency, the reactor of high purity and high quality which has high saturation magnetic flux density and low magnetic loss, and has good soft magnetic characteristics that a magnetic property is ferromagnetic and a hysteresis characteristic is small.

Figure 5:
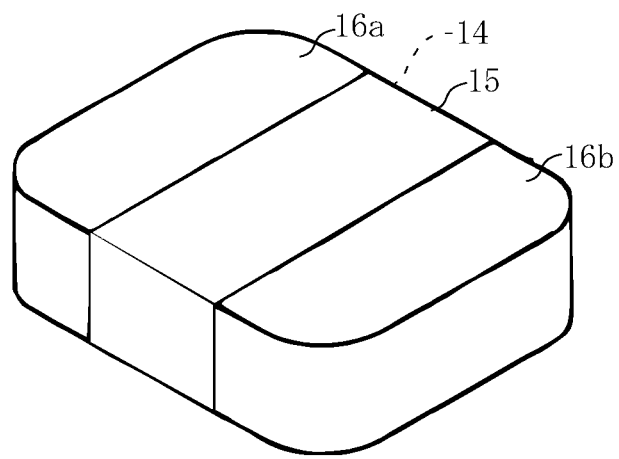
FIG. 5 is a perspective view of an inductor as a second embodiment of the coil component according to the present disclosure.

FIG. 5 is a perspective view of an inductor as a second embodiment of a coil component according to the present disclosure.

In the inductor, a protection layer 15 is formed on an almost central part of the surface of the magnetic part 14 formed into a rectangular shape, and a pair of external electrodes 16a and 16b are formed in a state of sandwiching the protection layer 15 at both ends of the surface of the magnetic part 14.

Figure 6:
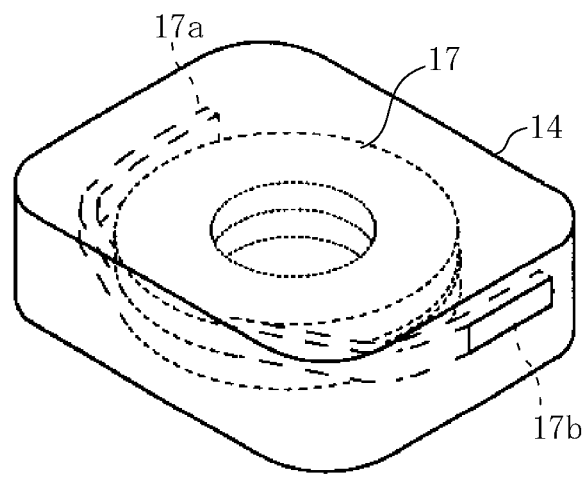
FIG. 6 is a perspective view showing an internal structure of the above inductor.

FIG. 6 is a perspective view showing an internal structure of the inductor. In FIG. 6, the protection layer 15 and the external electrodes 16a and 16b are omitted for convenience of explanation.

The magnetic part 14 contains the magnetic powder of the present disclosure as a principal component as with the magnetic core 12, and is formed of a composite material containing a resin material such as an epoxy resin. A coil conductor 17 is buried in the magnetic part 14.

In addition, the content of the magnetic powder in the composite material is not particularly limited, and is preferably not less than 60 vol % in terms of volume ratio, and more preferably 60 to 99 vol % for the same reason as in the magnetic core 12 described above.

The coil conductor 17 has a cylindrical shape formed by winding a rectangular wire in the form of a coil, and both ends 17a and 17b are exposed to the end surface of the magnetic part 14 so that the both ends 17a and 17b can be electrically connected to the external electrodes 16a and 16b. Specifically, in the coil conductor 17, as with the first embodiment, a rectangular wire lead made of copper or the like is coated with an insulating resin such as a polyester resin or a polyamide imide resin and formed into a belt shape, and wound in the form of a coil so as to have a hollow core.

The inductor can be easily prepared in the following manner.

First, the present magnetic powder and a resin material are kneaded and dispersed to prepare a composite material as with the first embodiment. Then, a coil conductor 17 is buried in a composite material so that the coil conductor 17 is sealed with the composite material. A forming process is applied using, for example, a compression forming method to obtain a compact in which the coil conductor 17 is buried. Then, the compact is taken out of a forming die, heat treated, and subjected to surface polishing to obtain a magnetic part 14 in which ends 17a and 17b of the coil conductor 17 are exposed to end surfaces.

Next, an insulating resin is applied to the surface of the magnetic part 14 other than to an area where the external electrodes 16a and 16b are formed and the resin is cured to form a protection layer 15.

Thereafter, the external electrodes 16a and 16b containing a conductive material as a principal component are formed at both ends of the magnetic part 14, and thereby, the inductor is prepared.

A method of forming the external electrodes 16a and 16b is not particularly limited, and these electrodes can be formed by an optional method, such as an application method, a plating method, and a thin film forming method.

Thus, in the present inductor, since the coil conductor is buried in the magnetic part 14 and the magnetic part 14 contains the above-mentioned magnetic powder as a principal component, it is possible to obtain, with high efficiency, a coil component of high purity and high quality which has high saturation magnetic flux density and low magnetic loss, and has good soft magnetic characteristics that a magnetic property is ferromagnetic and a hysteresis characteristic is small.

In addition, the present disclosure is not limited to the above-mentioned embodiments, and various variations may be made without departing from the gist of the disclosure. While in the above embodiments, coil components such as the reactor and the inductor are exemplified as a device using the magnetic powder, the present magnetic powder has high saturation magnetic flux density and low magnetic loss, and therefore the magnetic powder can also be applied to a stator core and a rotor core equipped in a motor. That is, the motor usually includes a stator core in which a plurality of armature teeth are spaced at regular intervals on the same circumference; a coil conductor wound around the armature teeth; and a rotor core arranged rotatably inside the stator core. Then, since the present magnetic powder has high saturation magnetic flux density and low magnetic loss, when the principal component of at least one, preferably both, of the stator core and the rotor core is the present magnetic powder, it becomes possible to obtain a motor of high quality which is low in power loss.

Further, the production method of the magnetic core 12 or the magnetic part 14 is not limited to the compression forming method described above, and an injection molding method or a transfer molding method may be used.

Element species constituting the present magnetic powder may be used as long as the alloy composition satisfies the above-mentioned range, and another element having the ability of amorphous material formation, for example, Ga, Ge or Pd, may be appropriately added. Further, even though the powder contains a trace of impurities such as Mn, Al, $N_2$ and Ti, characteristics are not affected.

In the above embodiment, the mixed product is heated/melted by high frequency induction heating; however, a heating/melting method is not limited to the high frequency induction heating, and for example, arc melting may be employed.

Next, examples of the present disclosure will be specifically described.

EXAMPLES

Preparation of Sample

Fe, Si, B, $Fe_3P$ and Cu were prepared as base materials. Then, these materials were mixed so that in the general formula $Fe_aSi_bB_cP_dCu_e$, a, b, c, d and e were atomic composition ratios shown in Tables 1 to 4, respectively, and the resulting mixtures were each heated to a melting point or higher in a high frequency induction furnace to be melted. Then the melted products were poured into a casting mold made of copper and cooled, and thereby master alloys were prepared.

Next, each of these master alloys was pulverized into a size of about 5 mm, and a gas atomization device brought into an atmosphere of a mixed gas formed by adding a hydrogen gas of 3% on the partial pressure basis to an argon gas, was prepared. Then, the master alloy was charged into a crucible of the gas atomization device, and melted by high frequency induction heating to obtain a molten metal.

Subsequently, in the above-mentioned mixed gas atmosphere, the argon gas adding the hydrogen gas as the jet fluid was sprayed to the molten metal to pulverize/quench the molten metal, and thereby an alloy powder was obtained. Then, the alloy powder was passed through a sieve with an opening of 38 μm to obtain samples of Nos. 1 to 64.

An average particle size of each of the obtained samples was measured with a particle size distribution analyzer (LA-300 manufactured by HORIBA, Ltd.), and consequently the average particle size was 20 to 30 μm.

Evaluation of Samples (Measurement of Saturation Magnetic Flux Density)

10 mg of each of sample Nos. 1 to 64 was taken, the sample was placed on a non-magnetic adhesive tape, and the adhesive tape was doubled up to be formed into a plate of 7 mm long and 7 mm wide. Next, saturation magnetization was measured at a maximum applied magnetic field of 12000 A/m at a room temperature (25° C.) using Vibrating Sample Magnetometer (VSM-5-10 manufactured by Toei Industry Co., Ltd.). Saturation magnetic flux density was calculated from the measured value and a true specific gravity of the sample.

(Identification of Powder Structure)

Using a powder X-ray diffractometer (RINT2200 manufactured by Rigaku Corporation), an X-ray diffraction spectrum was measured in measuring conditions of step width of 0.02° and step time of 2 seconds in a range in which a diffraction angle 2θ ranges from 30° to 90°, and a powder structure phase of each sample was identified from the X-ray diffraction spectrum.

Figure 7:
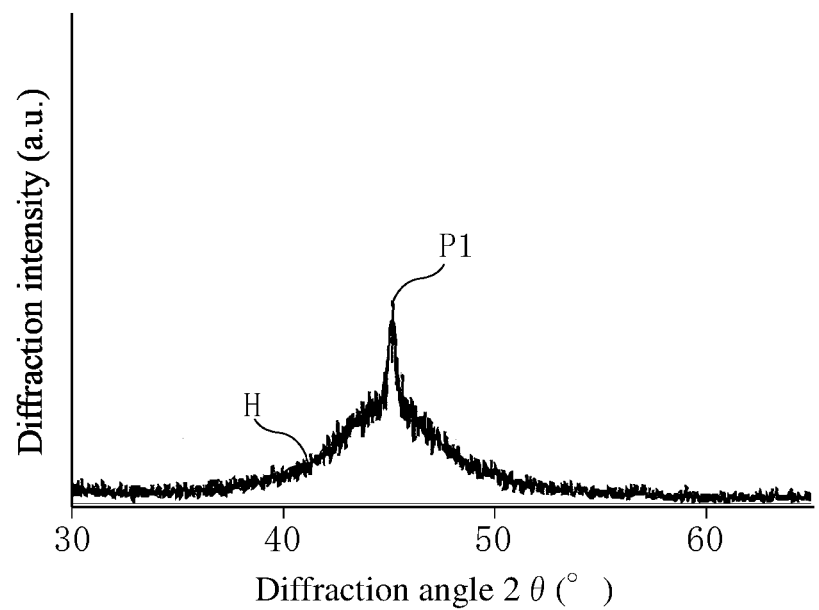
FIG. 7 is an X-ray diffraction spectrography of a sample No. 2.
Figure 8:
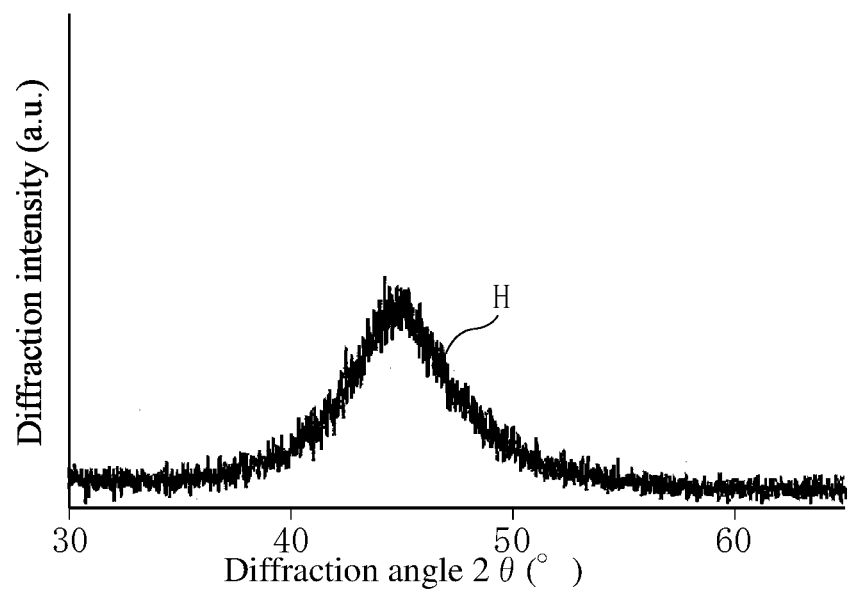
FIG. 8 is an X-ray diffraction spectrography of a sample No. 11.
Figure 9:
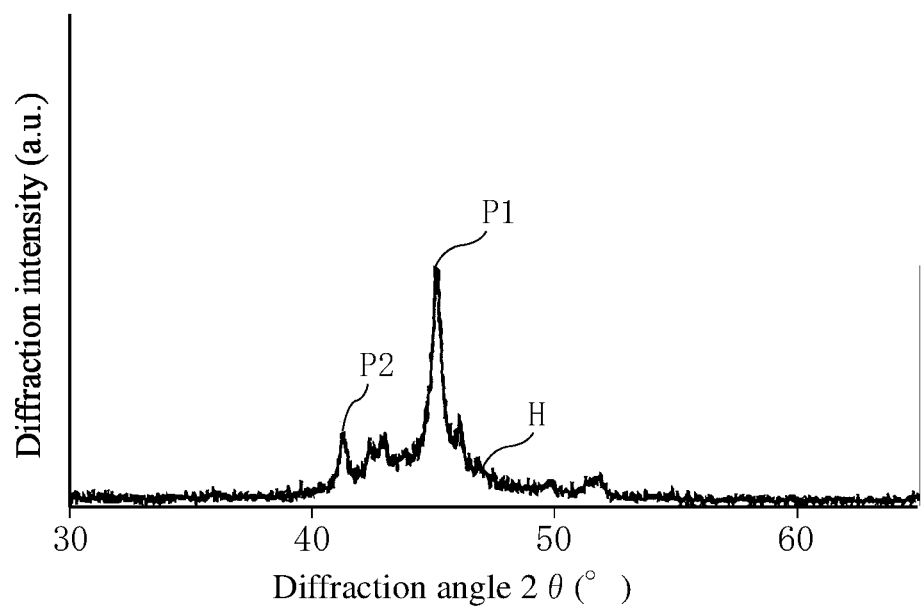
FIG. 9 is an X-ray diffraction spectrography of a sample No. 46.

FIGS. 7 to 9 show an example of an X-ray diffraction spectrography. Specifically, FIG. 7 shows an X-ray diffraction spectrography of the sample No. 2, and FIG. 8 shows an X-ray diffraction spectrography of the sample No. 11. FIG. 9 shows an X-ray diffraction spectrography of the sample No. 46. In FIGS. 7 to 9, a horizontal axis represents a diffraction angle 2θ(°) and a vertical axis represents diffraction intensity (a.u.).

As shown in FIG. 7, in the sample No. 2, the halo H indicating an amorphous phase was detected, and a peak P1 indicating a crystalline phase was present. The peak P1 represents a body-centered cubic crystal structure because the diffraction angle 2θ appears in the vicinity of 45°, and the body-centered cubic crystal structure is thought to be the α-Fe phase from alloy composition. Accordingly, it can be identified that the sample No. 2 has the amorphous phase and the α-Fe phase.

As shown in FIG. 8, in the sample No. 11, a peak indicating the crystalline phase was not present, and only the halo H indicating the amorphous phase was detected, and therefore it can be identified that the sample No. 11 is a single-phase of the amorphous phase.

As shown in FIG. 9, in the sample No. 46, the halo H indicating the amorphous phase, the peak P1 indicating the α-Fe phase and the peak P2 indicating another crystalline phase other than the α-Fe phase were detected. Since the peak P2 is considered as a compound phase formed by coupling between constituent elements, such as Fe—B, it can be identified that the sample No. 46 has the amorphous phase, the α-Fe phase and the compound phase.

Similarly, a powder structural phase of each of the sample Nos. 1, 3 to 10, 12 to 45, and 47 to 66 was identified from the X-ray diffraction spectrum.

Further, the crystallinity Φ of each sample was calculated based on the formula (8) described in the DETAILED DESCRIPTION from the X-ray diffraction spectrum.

(Magnetic Loss)

3 parts by weight of an epoxy resin was added to 100 parts by weight of each of sample Nos. 1 to 64 (volume content of the epoxy resin was 15 vol %), and the resulting mixture was press formed at a pressure of 100 MPa to prepare a toroidal core having an outer diameter of 13 mm, an inner diameter of 8 mm and a thickness of 2.5 mm.

An enameled copper wire having a wire diameter of 0.3 mm was double wound around the periphery of a toroidal core so that the number of turns of primary windings for excitation and the number of turns of secondary windings for voltage detection were each 16 to obtain a sample for measuring the core loss.

Then, using a B-H analyzer (SY-8217 manufactured by IWATSU ELECTRIC CO., LTD.), a core loss (magnetic loss) was measured at a frequency of 1 MHz and at a magnetic field of 30 mT.

(Measurements)

Tables 1 to 4 show component composition, saturation magnetization, saturation magnetic flux density, identified phase of a powder structure, and a core loss of each of the sample Nos. 1 to 64. In addition, in Tables 3 and 4, a mark "*" indicates a sample out of a scope of the present disclosure.

TABLE 1

| Sample No. | Alloy Composition: $Fe_aSi_bB_cP_dCu_e$ | | | | | | | | Saturation magnetization ($A \cdot m^2/kg$) | Saturation magnetic flux density (T) | Identified phase | Core loss ($kW/m^3$) |
|---|---|---|---|---|---|---|---|---|---|---|---|---|
| | a | b | c | d | e | X | Y | Z | | | | |
| 1 | 75.9 | 9.0 | 15.0 | 0.0 | 0.1 | 0.60 | 10.7 | 2.4 | 164 | 1.48 | amorphous α-Fe | 2047 |
| 2 | 75.7 | 9.0 | 15.0 | 0.0 | 0.3 | 0.60 | 10.6 | 2.4 | 165 | 1.49 | amorphous α-Fe | 2155 |
| 3 | 75.5 | 9.0 | 15.0 | 0.0 | 0.5 | 0.60 | 10.4 | 2.5 | 163 | 1.47 | amorphous α-Fe | 2115 |
| 4 | 75.2 | 9.0 | 15.0 | 0.0 | 0.8 | 0.60 | 10.2 | 2.5 | 164 | 1.48 | amorphous α-Fe | 1965 |
| 5 | 75.9 | 9.0 | 13.0 | 2.0 | 0.1 | 0.69 | 10.7 | 2.2 | 170 | 1.52 | amorphous | 1738 |
| 6 | 75.7 | 9.0 | 13.0 | 2.0 | 0.3 | 0.69 | 10.6 | 2.2 | 172 | 1.54 | amorphous | 1555 |
| 7 | 75.5 | 9.0 | 13.0 | 2.0 | 0.5 | 0.69 | 10.4 | 2.3 | 165 | 1.47 | amorphous | 1650 |
| 8 | 75.2 | 9.0 | 13.0 | 2.0 | 0.8 | 0.69 | 10.2 | 2.3 | 163 | 1.46 | amorphous α-Fe | 1566 |
| 9 | 75.9 | 9.0 | 11.0 | 4.0 | 0.1 | 0.82 | 10.7 | 2.0 | 165 | 1.47 | amorphous | 1719 |
| 10 | 75.7 | 9.0 | 11.0 | 4.0 | 0.3 | 0.82 | 10.6 | 2.0 | 168 | 1.50 | amorphous | 1518 |
| 11 | 75.5 | 9.0 | 11.0 | 4.0 | 0.5 | 0.82 | 10.4 | 2.1 | 168 | 1.50 | amorphous | 1712 |
| 12 | 75.2 | 9.0 | 11.0 | 4.0 | 0.8 | 0.82 | 10.2 | 2.1 | 162 | 1.44 | amorphous | 1292 |
| 13 | 75.9 | 9.0 | 9.0 | 6.0 | 0.1 | 1.00 | 10.7 | 1.8 | 168 | 1.50 | amorphous | 1250 |
| 14 | 75.7 | 9.0 | 9.0 | 6.0 | 0.3 | 1.00 | 10.6 | 1.8 | 166 | 1.47 | amorphous | 1343 |
| 15 | 75.5 | 9.0 | 9.0 | 6.0 | 0.5 | 1.00 | 10.4 | 1.9 | 167 | 1.48 | amorphous | 1476 |
| 16 | 75.2 | 9.0 | 9.0 | 6.0 | 0.8 | 1.00 | 10.2 | 1.9 | 157 | 1.39 | amorphous α-Fe | 1520 |

TABLE 1-continued

| Sample No. | Alloy Composition: $Fe_aSi_bB_cP_dCu_e$ | | | | | X | Y | Z | Saturation magnetization ($A \cdot m^2/kg$) | Saturation magnetic flux density (T) | Identified phase | Core loss ($kW/m^3$) |
|---|---|---|---|---|---|---|---|---|---|---|---|---|
| | a | b | c | d | e | | | | | | | |
| 17 | 75.9 | 9.0 | 7.0 | 8.0 | 0.1 | 1.29 | 10.7 | 1.6 | 163 | 1.45 | amorphous | 1384 |
| 18 | 75.7 | 9.0 | 7.0 | 8.0 | 0.3 | 1.29 | 10.6 | 1.6 | 165 | 1.47 | amorphous | 1427 |
| 19 | 75.5 | 9.0 | 7.0 | 8.0 | 0.5 | 1.29 | 10.4 | 1.7 | 161 | 1.43 | amorphous | 1391 |
| 20 | 75.2 | 9.0 | 7.0 | 8.0 | 0.8 | 1.29 | 10.2 | 1.7 | 154 | 1.36 | amorphous | 1683 |
| 21 | 75.9 | 9.0 | 5.0 | 10.0 | 0.1 | 1.80 | 10.7 | 1.4 | 161 | 1.43 | amorphous | 2003 |
| 22 | 75.7 | 9.0 | 5.0 | 10.0 | 0.3 | 1.80 | 10.6 | 1.4 | 161 | 1.43 | amorphous | 1516 |
| 23 | 75.5 | 9.0 | 5.0 | 10.0 | 0.5 | 1.80 | 10.4 | 1.5 | 160 | 1.42 | amorphous α-Fe | 1862 |
| 24 | 75.2 | 9.0 | 5.0 | 10.0 | 0.8 | 1.80 | 10.2 | 1.5 | 151 | 1.34 | amorphous α-Fe | 1549 |
| 25 | 74.7 | 9.0 | 11.0 | 4.0 | 1.3 | 0.82 | 9.8 | 2.1 | 163 | 1.45 | amorphous α-Fe | 2453 |
| 26 | 74.7 | 9.0 | 7.0 | 8.0 | 1.3 | 1.29 | 9.8 | 1.7 | 160 | 1.42 | amorphous α-Fe | 2394 |
| 27 | 79.9 | 10.0 | 6.0 | 4.0 | 0.1 | 1.67 | 13.9 | 1.6 | 169 | 1.55 | amorphous α-Fe | 3183 |
| 28 | 79.7 | 10.0 | 6.0 | 4.0 | 0.3 | 1.67 | 13.8 | 1.6 | 168 | 1.54 | amorphous α-Fe | 2695 |
| 29 | 79.5 | 10.0 | 6.0 | 4.0 | 0.5 | 1.67 | 13.6 | 1.7 | 180 | 1.65 | amorphous α-Fe | 2797 |

TABLE 2

| Sample No. | Alloy Composition: $Fe_aSi_bB_cP_dCu_e$ | | | | | X | Y | Z | Saturation magnetization ($A \cdot m^2/kg$) | Saturation magnetic flux density (T) | Identified phase | Core loss ($kW/m^3$) |
|---|---|---|---|---|---|---|---|---|---|---|---|---|
| | a | b | c | d | e | | | | | | | |
| 30 | 79.9 | 6.0 | 6.0 | 8.0 | 0.1 | 1.00 | 13.9 | 1.2 | 171 | 1.56 | amorphous α-Fe | 2548 |
| 31 | 79.7 | 6.0 | 6.0 | 8.0 | 0.3 | 1.00 | 13.8 | 1.2 | 170 | 1.55 | amorphous α-Fe | 2723 |
| 32 | 79.5 | 6.0 | 6.0 | 8.0 | 0.5 | 1.00 | 13.6 | 1.3 | 168 | 1.54 | amorphous α-Fe | 2586 |
| 33 | 79.9 | 2.0 | 6.0 | 12.0 | 0.1 | 0.33 | 13.9 | 0.8 | 168 | 1.53 | amorphous α-Fe compound | 2555 |
| 34 | 79.7 | 3.0 | 4.0 | 13.0 | 0.3 | 0.75 | 13.8 | 0.7 | 154 | 1.39 | amorphous α-Fe compound | 2698 |
| 35 | 79.7 | 2.0 | 6.0 | 12.0 | 0.3 | 0.33 | 13.8 | 0.8 | 167 | 1.53 | amorphous α-Fe compound | 2436 |
| 36 | 79.5 | 2.0 | 6.0 | 12.0 | 0.5 | 0.33 | 13.6 | 0.9 | 166 | 1.51 | amorphous α-Fe compound | 2594 |
| 37 | 79.2 | 6.0 | 6.0 | 8.0 | 0.8 | 1.00 | 13.4 | 1.3 | 165 | 1.52 | amorphous α-Fe compound | 2956 |
| 38 | 79.2 | 2.0 | 6.0 | 12.0 | 0.8 | 0.33 | 13.4 | 0.9 | 164 | 1.50 | amorphous α-Fe compound | 3845 |
| 39 | 80.0 | 11.0 | 8.5 | 0.0 | 0.5 | 1.29 | 14.0 | 2.0 | 175 | 1.58 | amorphous α-Fe compound | 3628 |
| 40 | 71.0 | 10.7 | 12.2 | 6.0 | 0.1 | 0.88 | 6.8 | 2.3 | 145 | 1.30 | amorphous α-Fe compound | 3866 |
| 41 | 71.0 | 11.0 | 11.4 | 6.5 | 0.1 | 0.96 | 6.8 | 2.3 | 145 | 1.30 | amorphous α-Fe compound | 3985 |
| 42 | 71.0 | 14.0 | 13.9 | 1.0 | 0.1 | 1.01 | 6.8 | 2.8 | 148 | 1.30 | amorphous α-Fe compound | 3901 |
| 43 | 81.0 | 9.5 | 1.9 | 7.5 | 0.1 | 5.00 | 14.8 | 1.2 | 165 | 1.49 | amorphous α-Fe compound | 3970 |
| 44 | 81.0 | 4.0 | 1.9 | 13.0 | 0.1 | 2.11 | 14.8 | 0.6 | 163 | 1.49 | amorphous α-Fe compound | 3725 |

TABLE 3

| Sample No. | Alloy Composition: $Fe_aSi_bB_cP_dCu_e$ | | | | | X | Y | Z | Saturation magnetization (A·m²/kg) | Saturation magnetic flux density (T) | Identified phase | Core loss (kW/m³) |
| --- | --- | --- | --- | --- | --- | --- | --- | --- | --- | --- | --- | --- |
| | a | b | c | d | e | | | | | | | |
| 45* | 74.5 | 9.0 | 7.0 | 8.0 | 1.5 | 1.29 | 9.6 | 1.8 | 159 | 1.42 | amorphous α-Fe | 4017 |
| 46* | 75.7 | 9.0 | 3.0 | 12.0 | 0.3 | 3.00 | 10.6 | 1.2 | 158 | 1.40 | amorphous α-Fe compound | 6858 |
| 47* | 75.5 | 9.0 | 3.0 | 12.0 | 0.5 | 3.00 | 10.4 | 1.3 | 155 | 1.38 | amorphous α-Fe compound | 5619 |
| 48* | 74.7 | 9.0 | 3.0 | 12.0 | 1.3 | 3.00 | 9.8 | 1.3 | 154 | 1.36 | amorphous α-Fe compound | 5838 |
| 49* | 75.7 | 8.0 | 3.0 | 13.0 | 0.3 | 2.67 | 10.6 | 1.1 | 155 | 1.38 | amorphous α-Fe compound | 8489 |
| 50* | 79.2 | 3.0 | 4.0 | 13.0 | 0.8 | 0.75 | 13.4 | 0.8 | 152 | 1.38 | amorphous α-Fe compound | 4005 |
| 51* | 78.5 | 6.0 | 6.0 | 8.0 | 1.5 | 1.00 | 12.8 | 1.4 | 163 | 1.51 | amorphous α-Fe compound | 5171 |
| 52* | 78.7 | 2.0 | 6.0 | 12.0 | 1.3 | 0.33 | 13.0 | 0.9 | 162 | 1.48 | amorphous α-Fe compound | 7835 |
| 53* | 75.7 | 0.0 | 7.2 | 16.8 | 0.3 | 0.00 | 10.6 | 0.8 | 156 | 1.42 | α-Fe compound | 6870 |

Mark "*" indicates a sample out of a scope of the present disclosure.

TABLE 4

| Sample No. | Alloy Composition: $Fe_aSi_bB_cP_dCu_e$ | | | | | X | Y | Z | Saturation magnetization (A·m²/kg) | Saturation magnetic flux density (T) | Identified phase | Core loss (kW/m³) |
| --- | --- | --- | --- | --- | --- | --- | --- | --- | --- | --- | --- | --- |
| | a | b | c | d | e | | | | | | | |
| 54* | 75.7 | 4.8 | 2.4 | 16.8 | 0.3 | 2.00 | 10.6 | 0.8 | 153 | 1.36 | α-Fe compound | 10159 |
| 55* | 78.9 | 4.2 | 2.1 | 14.7 | 0.1 | 2.00 | 13.1 | 0.6 | 163 | 1.45 | amorphous α-Fe compound | 9274 |
| 56* | 70.0 | 9.0 | 17.7 | 3.0 | 0.3 | 0.51 | 6.0 | 2.7 | 154 | 1.37 | amorphous α-Fe compound | 4145 |
| 57* | 70.0 | 4.4 | 15.0 | 10.5 | 0.1 | 0.29 | 6.0 | 2.0 | 142 | 1.26 | amorphous α-Fe compound | 4308 |
| 58* | 70.9 | 10.2 | 11.5 | 7.3 | 0.1 | 0.89 | 6.7 | 2.2 | 143 | 1.28 | amorphous α-Fe compound | 4221 |
| 59* | 71.0 | 2.9 | 23.0 | 2.8 | 0.3 | 0.13 | 6.8 | 2.6 | 157 | 1.42 | amorphous α-Fe compound | 4936 |
| 60* | 81.0 | 1.1 | 8.4 | 9.5 | 0.0 | 0.13 | 14.8 | 0.9 | 175 | 1.59 | α-Fe compound | 4295 |
| 61* | 82.0 | 3.6 | 3.6 | 10.0 | 0.8 | 1.00 | 15.6 | 0.8 | 173 | 1.56 | α-Fe compound | N.D. |
| 62* | 82.0 | 1.6 | 1.6 | 14.0 | 0.8 | 1.00 | 15.6 | 0.4 | 167 | 1.54 | α-Fe compound | N.D. |
| 63* | 82.0 | 12.2 | 2.2 | 3.5 | 0.1 | 5.55 | 15.6 | 1.5 | 166 | 1.51 | amorphous α-Fe compound | 4447 |
| 64* | 82.0 | 5.3 | 5.4 | 7.2 | 0.1 | 0.98 | 15.6 | 1.1 | 174 | 1.58 | amorphous α-Fe | 4511 |

Mark "*" indicates a sample out of a scope of the present disclosure.

As is apparent from Table 4, it was found that in the sample Nos. 56 to 58, since the atomic composition ratios a of Fe ranged from 70.0 to 70.9 and were as low as less than 71.0, the core losses exceeded 4000 kW/m³ to cause lowering of the magnetic characteristics. Particularly, in the sample Nos. 57 and 58, the core losses became larger since both of the atomic composition ratios d of P were larger than Y (=0.8a−50).

In the sample Nos. 61 to 64, since the atomic composition ratios a of Fe were 82.0 and exceeded 81.0, the core losses also exceeded 4000 kW/m³ in this case to cause an increase of the core loss. Particularly, in the sample Nos. 61 and 62, it was found that the core losses became as large as an attempt to measure the core loss with the present B-H analyzer failed since the atomic composition ratios e of Cu of the sample Nos. 61 and 62 were equal to or larger than Z (=−0.1(a+d)+10).

In addition, in the sample No. 63, since X exceeded 5 and the content of Si was greater than the content of B, the core loss came to 4447 kW/m³ and was increased compared with samples within the scope of the present disclosure, but was smaller than that of the sample No. 64. The reason for this is supposedly that a slight difference in composition between the sample No. 63 and the sample No. 64 has a delicate effect on the core loss. However, it is thought in any case that X exceeding 5 causes an increase of the magnetic loss.

In the sample Nos. 54 and 55, since the atomic composition ratios d of P exceeded 14 and furthermore the atomic composition ratios d were larger than Y, the core losses came to 9274 to 10159 kW/m³, and these samples caused a marked increase of the core loss.

It was found that in the sample Nos. 59 and 60, since the X (=b/c) of the atomic composition ratio b of Si and the atomic composition ratio c of B was less than 0.14, and the content of B to the content of Si was too small, the core losses exceeded 4000 kW/m³ to cause lowering of the magnetic characteristics.

In addition, since the sample No. 60 had the atomic composition ratio e of Cu of 0 and did not contain Cu, the core loss came to 4295 kW/m³ and was increased compared with samples within the scope of the present disclosure, but was smaller than that of the sample No. 59. The reason for this is supposedly that a slight difference in composition between the sample No. 59 and the sample No. 60 has a delicate effect on the core loss. However, it is thought in any case that the case of not containing Cu causes an increase of the core loss.

Further, as is apparent from Table 3, in the sample No. 53, since Si was not contained Si, the atomic composition ratios d of P exceeded 14 and furthermore the atomic composition ratios d was larger than Y (=0.8a−50), the core losses came to 6870 kW/m³, and this sample caused a marked increase of the core loss.

In the sample Nos. 46 to 49, all of the atomic composition ratios d of P were larger than Y, and this caused a marked increase of the core loss.

In the sample Nos. 45 and 51, since the atomic composition ratios e of Cu exceeded 1.4, the core loss was increased exceeding 4000 kW/m³. Particularly, since the sample No. 51 had the atomic composition ratio e of Cu which exceeded Z (=−0.1(d+a)+10), the core loss was more increased than that of the sample No. 45.

In the sample Nos. 50 and 52, since the atomic composition ratios e of Cu were equal to or larger than Z (=−0.1 (d+a)+10), the core losses were increased. Particularly, the sample No. 52 had the atomic composition ratio e larger than Z, and therefore the core loss was more increased than that of the sample No. 50.

On the other hand, as shown in Table 1 and Table 2, it was found that in the sample Nos. 1 to 44, since the general formula (A) satisfies the formulas (1) to (7) and is within the scope of the present disclosure, the saturation magnetic flux density was 1.30 T or more, and the core loss can be suppressed to 4000 kW/m³ or less.

Table 5 shows the crystallinity $\Phi$ of the sample Nos. 1, 4, 16, 24, 28, 31, 38, 46, 48, and 52.

TABLE 5

| Sample No. | Composition | Crystallinity (%) |
|---|---|---|
| 1 | $Fe_{75.9}Si_{9.0}B_{15.0}Cu_{0.1}$ | 4.5 |
| 4 | $Fe_{75.2}Si_{9.0}B_{15.0}Cu_{0.8}$ | 10.8 |
| 16 | $Fe_{75.2}Si_{9.0}B_{9.0}P_{6.0}Cu_{0.8}$ | 0.7 |
| 24 | $Fe_{75.2}Si_{9.0}B_{5.0}P_{10.0}Cu_{0.8}$ | 2.1 |
| 28 | $Fe_{79.7}Si_{10.0}B_{6.0}P_{4.0}Cu_{0.3}$ | 59.4 |
| 31 | $Fe_{79.7}Si_{6.0}B_{6.0}P_{8.0}Cu_{0.3}$ | 11.1 |
| 38 | $Fe_{79.2}Si_{2.0}B_{6.0}P_{12.0}Cu_{0.8}$ | 26.5 |
| 46* | $Fe_{75.2}Si_{9.0}B_{3.0}P_{12.0}Cu_{0.3}$ | 41.1 |
| 48* | $Fe_{74.7}Si_{9.0}B_{3.0}P_{12.0}Cu_{1.3}$ | 38.2 |
| 52* | $Fe_{78.7}Si_{2.0}B_{6.0}P_{12.0}Cu_{1.3}$ | 62.4 |

Mark "*" indicates a sample out of a scope of the present disclosure.

As is apparent from Table 5, it was found that the sample Nos. 46, 48, and 52 were out of the scope of the present disclosure containing the compound phase have the crystallinity $\Phi$ more than 30%.

On the other hand, it was verified that the sample No. 38 of the present disclosure containing the compound phase had the crystallinity $\Phi$ of 30% or less, and all of the sample Nos. 1, 4, 16, 24, 28 and 31 of the present disclosure not containing the compound phase had the crystallinity $\Phi$ of 60% or less.

With respect to other sample numbers, it was verified that in the case of containing the compound phase, the samples within the scope of the present disclosure have the crystallinity $\Phi$ of 30% or less and the samples out of the scope of the present disclosure have the crystallinity $\Phi$ more than 30%, and it was verified that in the case of not containing the compound phase, the samples within the scope of the present disclosure have the crystallinity $\Phi$ of 60% or less and the samples out of the scope of the present disclosure have the crystallinity $\Phi$ more than 60%.

From the above, when the general formula (A) satisfies the formulas (1) to (7), the crystallinity $\Phi$ of the sample is 30% or less in the case of containing the compound phase, and the crystallinity $\Phi$ of the sample is 60% or less in the case of not containing the compound phase. Further, it was found that it is possible to obtain a magnetic powder having high saturation magnetic flux density of 1.30 T or more and low core loss of 4000 kW/m³ or less even though a powder structure includes not only a single-phase of an amorphous phase but also a crystalline phase.

INDUSTRIAL APPLICABILITY

It is possible to realize the soft magnetic powder of high quality having high saturation magnetic flux density and low magnetic loss, and a magnetic core, a coil component such as an inductor and a motor which respectively use the magnetic powder.

The invention claimed is:

1. A magnetic powder comprising a principal component represented by a general formula $Fe_aSi_bB_cP_dCu_e$,
wherein the a, the b, the c, the d, and the e satisfy:

$71.0 \leq a \leq 81.0$, $2.0 \leq b \leq 9.0$, $0.14 \leq b/c \leq 5$, $0 \leq d \leq 14$, $0 < e \leq 1.4$, $d \leq 0.8a-50$, $e < -0.1(a+d)+10$, and $a+b+c+d+e=100$, and further comprising at least an amorphous phase, and a crystalline phase consisting of a compound.

2. The magnetic powder according to claim 1, wherein saturation magnetic flux density is not less than 1.30 T.

3. A magnetic core, wherein a principal component is formed of the magnetic powder according to claim 1.

4. The magnetic core according to claim 3, wherein the magnetic core contains a binder, and the content of the magnetic powder is not less than 60 vol % in terms of volume ratio.

5. A coil component in which a coil conductor is wound around a core part,
wherein the core part is formed of the magnetic core according to claim 4.

6. A coil component in which a coil conductor is buried in a magnetic part,
wherein a principal component of the magnetic part is formed of the magnetic powder according to claim 1.

7. The coil component according to claim 6, wherein the magnetic part contains a binder, and
the content of the magnetic powder in the magnetic part is, in terms of volume ratio, not less than 60 vol % in terms of volume ratio.

8. A motor comprising
a stator core in which a plurality of armature teeth are spaced at regular intervals on the same circumference;
a coil conductor wound around the armature teeth; and
a rotor core arranged rotatably inside the stator core,
wherein a principal component of at least one of the stator core and the rotor core is formed of the magnetic powder according to claim 1.

9. The magnetic powder according to claim 1, wherein the b, the c, and the d further satisfy:

$1.29 \leq b/c \leq 5.00$, and $6.0 \leq d \leq 14$.

10. The magnetic powder according to claim 1, wherein the a, the b, the c, the d, and the e further satisfy:

$74.7 \leq a \leq 81.0$, $4.0 \leq b \leq 9.0$, $1.9 \leq c \leq 7.0$, $7.5 \leq d \leq 13.0$, and $0.1 \leq e \leq 1.3$.

11. The magnetic powder according to claim 10, wherein the a and the d further satisfy:

$9.8 \leq 0.8a-50 \leq 14.8$, and $0.6 \leq -0.1(a+d)+10 \leq 1.7$.

12. The magnetic powder according to claim 1, wherein the b further satisfies:

$2.0 \leq b \leq 6.0$.

13. A magnetic powder consisting essentially of:
a principal component represented by a general formula $Fe_aSi_bB_cP_dCu_e$,
wherein the a, the b, the c, the d, and the e satisfy:

$71.0 \leq a \leq 81.0$, $2.0 \leq b \leq 9.0$, $0.14 \leq b/c \leq 5$, $6.0 \leq d \leq 14$, $0 \leq e \leq 1.4$, $d \leq 0.8a-50$, $e < -0.1(a+d)+10$, and $a+b+c+d+e=100$.

14. The magnetic powder according to claim 13, wherein the a, the b, the c, the d, and the e further satisfy:

$74.6 \leq a \leq 81.0$, $4.0 \leq b \leq 6.0$, $1.9 \leq c \leq 7.0$, $1.29 \leq b/c \leq 5.00$, $7.5 \leq d \leq 13.0$, $0.1 \leq e \leq 1.3$, $9.8 \leq 0.8a-50 \leq 14.8$, and $0.6 \leq -0.1(a+d)+10 \leq 1.7$.

* * * * *